(12) United States Patent
Kato (10) Patent No.: US 6,453,233 B1
(45) Date of Patent: Sep. 17, 2002

(54) METHOD OF MAKING UPDATE INFORMATION OF MAP DATA AND DIFFERENTIAL DATA OF MAP DATA UPDATING SYSTEM

(75) Inventor: Noriko Kato, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/649,819

(22) Filed: Aug. 28, 2000

(30) Foreign Application Priority Data

Aug. 31, 1999 (JP) .......................................... 11-245414

(51) Int. Cl.⁷ .................. G06F 17/30; G09B 29/02; G08G 1/0969
(52) U.S. Cl. ................ 701/208; 701/210; 701/211; 340/995; 707/530
(58) Field of Search ............................... 701/208, 210, 701/211; 340/990, 995; 707/10, 203, 204, 101, 104, 205, 530

(56) References Cited

U.S. PATENT DOCUMENTS

| | | | | |
|---|---|---|---|---|
| 5,729,731 A | * | 3/1998 | Yajima et al. ............... | 395/603 |
| 5,893,113 A | * | 4/1999 | McGrath et al. ............ | 707/200 |
| 5,987,464 A | * | 11/1999 | Schneider .................... | 707/10 |
| 6,075,467 A | * | 6/2000 | Ninagawa ................... | 340/995 |
| 6,230,098 B1 | * | 5/2001 | Ando et al. ................. | 701/208 |

FOREIGN PATENT DOCUMENTS

| | | |
|---|---|---|
| JP | 1-163880 | 6/1989 |
| JP | 4-349574 | 12/1992 |
| JP | 9-90869 | 4/1997 |
| JP | 9-145383 | 6/1997 |
| JP | 9-311925 | 12/1997 |
| JP | 11-109849 | 4/1999 |

* cited by examiner

Primary Examiner—Tan Nguyen
(74) Attorney, Agent, or Firm—Law Offices of David G. Posz (57) ABSTRACT

A differential update method for vehicular navigation apparatus, which can precisely update map data stored in a storage medium to up-to-date contents. When a provider of CD generates original map data for each year, the provider puts a permanent identification information (ID) for each graphic data in the CD. When the provider generates the CD for each year from the original map data, the provider generates administration information in which the ID of each graphic data and storage position of the ID in the CD are associated with each other. After that, the provider also prepares a differential data by comparing a 20XX version original map data with a 20XY version original map data, and administration information for year 20XX. The provider generates the update information for updating the 20XX version CD to the 20XY version based on the differential data and the administration information, so that which graphic data in the CD is updated and is how is the graphic data updated. The provider transmits the update information to the vehicular navigation apparatus.

19 Claims, 7 Drawing Sheets

ORIGINAL MAP DATA

FIG. 4B

DATA IN CD·DVD

FIG. 5A

ID INFORMATION (LINK)

| PERMANENT ID | | STORAGE POSITION INFO. | |
|---|---|---|---|
| BLOCK ID | SUB-BLOCK ID | DATA BLOCK ID | STORAGE INFO. IN BLOCK |
| A | L1 | a | ⑥ |
| A | L2 | a | ⑦ |
| A | L3 | a | ⑧ |
| A | L4 | a | ⑨ |
| A | L5 | b | ④ |
| A | L6 | b | ⑤ |
| A | L7 | b | ⑥ |
| A | L8 | c | ② |
| A | L9 | c | ③ |
| A | L9 | d | ⑤ |
| A | L10 | d | ⑥ |
| A | L11 | d | ⑦ |
| A | L12 | a | ① |
| A | L13 | a | ② |
| A | L14 | a | ③ |
| A | L14 | c | ① |
| A | L15 | a | ④ |
| A | L16 | a | ⑤ |
| A | L17 | b | ① |
| A | L17 | d | ① |
| A | L18 | d | ② |
| A | L19 | b | ② |
| A | L20 | b | ③ |
| A | L20 | d | ③ |
| A | L21 | d | ④ |

FIG. 5B

ID INFORMATION (POLYGON)

| PERMANENT ID | | STORAGE POSITION INFO. | |
|---|---|---|---|
| BLOCK ID | SUB-BLOCK ID | DATA BLOCK ID | STORAGE INFO. IN BLOCK |
| A | P1 | a | $\alpha$ |
| A | P2 | a | $\beta$ |
| A | P2 | b | $\alpha$ |
| A | P2 | c | $\beta$ |
| A | P2 | d | $\alpha$ |
| A | P3 | c | $\beta$ |
| A | P3 | d | $\gamma$ |
| A | P4 | d | $\beta$ |

20XX ID INFORMATION (LINK)

| PERMANENT ID | | STORAGE POSITION INFO. | |
|---|---|---|---|
| BLOCK ID | SUB-BLOCK ID | DATA BLOCK ID | STORAGE INFO. IN BLOCK |
| A | L18 | d | ② |

20XX ID INFORMATION (POLYGON)

| PERMANENT ID | | STORAGE POSITION INFO. | |
|---|---|---|---|
| BLOCK ID | SUB-BLOCK ID | DATA BLOCK ID | STORAGE INFO. IN BLOCK |
| A | P3 | c | β |
| A | P3 | d | γ |

FIG. 7B

20XX-20XY DIFFERENTIAL DATA

- BLOCK ID=A, SUB-BLOCK ID=L18: DELETE
- BLOCK ID=A, SUB-BLOCK ID=P3 : DELETE

FIG. 7C

20XX-20XY INFORMATION FOR UPDATE

- DELETE DATA STORED IN ② IN DATA BLOCK d
- DELETE DATA STORED IN β IN DATA BLOCK c
- DELETE DATA STORED IN β IN DATA BLOCK d

METHOD OF MAKING UPDATE INFORMATION OF MAP DATA AND DIFFERENTIAL DATA OF MAP DATA UPDATING SYSTEM

CROSS REFERENCE TO RELATED APPLICATION

This application is based upon Japanese Patent Application No. Hei. 11-245414 filed on Aug. 31, 1999, the contents of which are incorporated herein by reference.

BACKGROUND OF THE INVENTION

1. Field of the Invention

This invention relates to methods of making update information of map data, and particular to a method of making update information of map data for updating map data stored in an electric device such as a terminal unit or a map display apparatus to up-to-date information by a unit of picture data. Here, the electric device is for fetching map data from a storage medium such as CD-ROM or DVD-ROM in which the map data is stored in advance and for displaying the map data. This invention also relates to differential data of map data updating systems.

2. Related Art

Hereinafter, a vehicular navigation apparatus will be used for explaining background of this kind of electric devices.

Conventionally, a vehicular navigation apparatus fetches map data which is necessary to realize each function including a map display or a route calculation from a storage medium (such as CD-ROM, DVD-ROM) in which map data has already stored.

Incidentally, the map data in the CD or DVD (hereinafter, described as "CD/DVD") provided to the vehicular navigation apparatus becomes out-of-date when new roads are constructed, when shapes of roads or traffic regulations are changed, or when several facilities are newly constructed or closed.

Therefore, the CD/DVD is sold with periodically (e.g., annually) updating the map data therein. The procedure will be explained in detail. At first, original data of the map data (hereinafter, called "original map data") to be stored in the CD/DVD is periodically updated (newly made). Thus, up-to-date original map data is made. After that, CD/DVD of up-to-date version is made by editing the up-to-date original map data. The up-to-date CD/DVD is sold. Here, the making of the CD/DVD by editing the original map data means that the original map data is edited, and then the edited map data is written into a blank CD or a blank DVD.

According to the conventional vehicular navigation apparatus, the user needs to purchase the CD/DVD every time the new version CD/DVD is issued, when the user desires to keep up with up-to-date information.

Here, a system of updating map data (differential update system) has been proposed in JP A 9-145383 or JP A 9-90869. According to this system, differential information (in detail, added, deleted, or changed data) between old map data in the CD/DVD, stored in the vehicular navigation apparatus and up-to-date map data, is transmitted from the external base center to the vehicular navigation apparatus by using radio communication or the like. The vehicular navigation apparatus updates the old map data to the up-to-date map data based on the differential information from the external base center.

When this kind of differential update system is actualized, the user of the vehicular navigation apparatus can obtain road information based on the up-to-date information without purchasing the up-to-date CD/DVD every time it is issued.

Incidentally, the differential information to be provided to the navigation is update information for partially updating the old map data to the up-to-date map data. Therefore, when this kind of differential update system is actualized, the differential information needs to contain information that which data in the map data is updated or how is the data updated.

In this case, the navigation apparatus needs to search particular data to be updated, corresponding data contained in the differential information having sent from the center, in the CD/DVD. After that, the navigation apparatus updates the searched data based on particular information which indicates update contents contained in the differential information.

However, in the case of such a system, when the data to be updated is graphic data which indicates a shape of graphic such as a polygon or a line (so-called "link"), the following inconvenience will occur.

The graphic data contained in the map data in the CD/DVD of the navigation apparatus is formed as shape point coordinate train data which is a coordinate train on an outline of the graphic. Therefore, the navigation apparatus needs to search the data that having the same graphic data sent from the center by graphically comparing each other one by one in the CD/DVD. As a result, it would take a long time to complete the update compared to the update of the other data such as names or address of the roads or facilities.

Furthermore, in general, when the original map data is edited to make the CD/DVD, data reducing process (editing) such as a shape-deform process or a thin out of the shape point coordinate train data to reduce the amount of data. Therefore, even if the graphic data stored in the CD/DVD and the graphic data contained in the original map data illustrate the same contents, each of the shape point coordinate train (each coordinate itself or the number thereof) has slight difference.

Therefore, for example, when several data are prepared in the center at the following timings (1)–(3), the navigation apparatus (at a side of user who purchases the CD/DVD) may cause the following inconvenience.

At a side of the external base center, it is assumed that the following processes are performed.

TIMING (1): At first particular original map data A and a CD/DVD (A) made by editing the particular original map data A are prepared.

TIMING (2): After that, a shape-change of the park a existing in the original map data A is performed. Then, an original data B is generated from the original map data A. A CD/DVD (B) made by editing the particular original map data B is prepared. Differential information a' regarding the shape-change of the park a is prepared.

TIMING (3): A shape-change of the park a which has been changed in the TIMING (2) and existing in the original map data B is performed again. Then, an original data C is generated from the original map data B. A CD/DVD (C) made by editing the particular original map data C is prepared. Differential information a" regarding the shape-change of the park a changed in the TIMING (2) is prepared.

Moreover, in this case, it is assumed that a user X has purchased the CD/DVD (A), a user Y has purchased the CD/DVD (A), and a user Z has purchased the CD/DVD (B).

Here, it is assumed that only the user X receives the differential information a' at the timing (2), so that the navigation apparatus of the user X updates the data of the CD/DVD (A). (The user Y does not receive the differential information a' at the timing (2). The user Z does not need to receive the differential data a'.)

In such a situation, when all of the users X, Y, Z receive the differential information a" at the timing (3) to update the data in their CD/DVD, the users Y and Z can update the data in the CD/DVD without any trouble. However, in this case, the user x may not be able to update the data.

This is because the graphic data illustrating the park a in the CD/DVD (A) becomes different from that in the CD/DVD (B) as a result of updating at a point when the CD/DVD of the user X updates the data based on the differential information a'. In this case, when the navigation apparatus tries to search the graphic data corresponding to the received differential information a", the navigation apparatus may detect that there is no corresponding graphic data.

This kind of inconvenience may cause due to the editing of the CD/DVD at the external base center (the shape-deform process or the thin out of the shape point coordinate train data) or due to an internal process of the update process in the navigation apparatus (regeneration of the graphic data).

SUMMARY OF THE INVENTION

This invention has been conceived in view of the background thus far described and its object is to precisely update map data stored in a storage medium to up-to-date contents.

According to the present invention, new original map data including graphic data is generated so that the permanent identification information is putted (associated) to each graphic data. The identification information between the new original map data and old original map data previously generated is identical.

Next, a map data is generated by editing the original map. The map data is recorded into a storage medium. Here, administration information includes the identification information of the graphic data in the map data and a storage position of the graphic data in the storage medium is generated. Here, the identification information and the storage position are associated with each other in the administration information.

Then, the new original map data is compared with the old original map data, and differential data is generated. The differential data indicates which graphic data being updated and how being the graphic data updated. The graphic data is identified by the identification information.

Update information for old map data generated by editing the old original data is generated. The update information is generated based on the administration data and the administration information generated when old map data is generated by editing the old original data. Here, the update information indicates which graphic data in the storage medium is updated and how is the graphic data updated. The graphic data is identifies by the storage position in the storage medium.

According to the structure in the above, target graphic data to be updated is not assigned by the graphic data itself, but is assigned by the storage position in the storage medium in which the target graphic data is stored. As a result, it can precisely and speedily search the target graphic data to be updated; and the map data can be precisely and speedily updated as a unit of graphic data.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

Hereinafter, a differential update system of map data in which the present invention is applied will be explained with reference to accompanying drawings.

Figure 1:
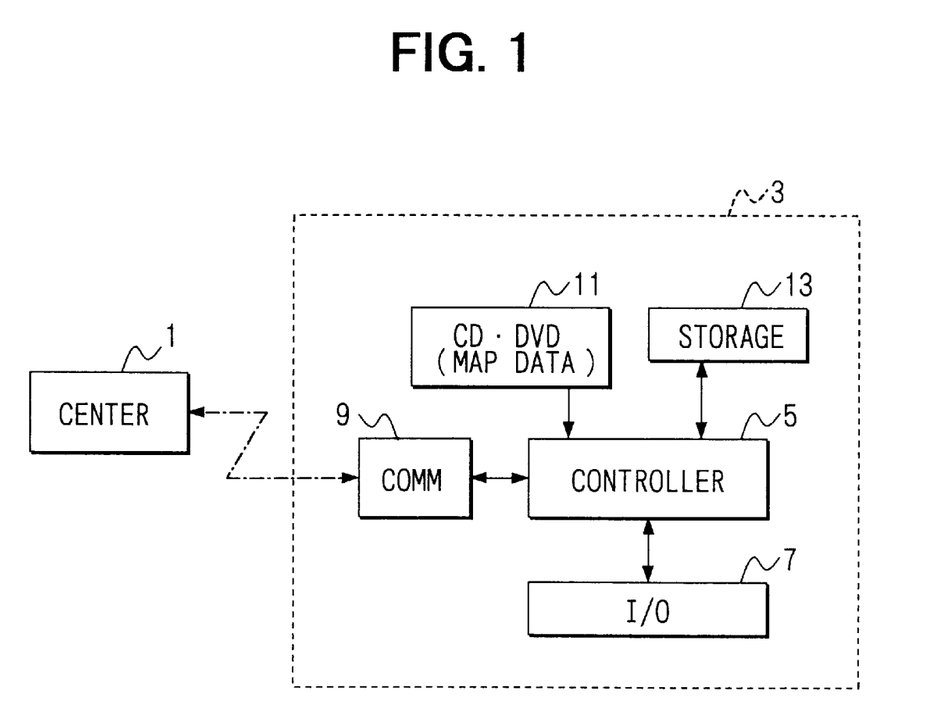
FIG. 1 is a sectional block diagram illustrating a differential update system of map data according to the present invention.

As shown in FIG. 1, the differential update system of this embodiment is provided with an external information provider provided on the ground; an information center (hereinafter, called "center") 1 as an external information center; and a navigation apparatus 3 mounted on a vehicle.

Here, this embodiment exemplifies the navigation apparatus; however, the present invention is applicable to the other terminal apparatus or an electric device for displaying map.

The navigation apparatus 3 is equipped with a controller 5 made up of mainly microcomputer; an input/output (I/O) unit 7 made up of a display, several kinds of key switches and soon; a communication unit 9 for radio-communicating with the center 1; a CD (or DVD) 11 (a storage medium in which map data is stored, or storage means); and a storage medium 13 for storing calculation results calculated by the controller 5. The CD or DVD (CD/DVD) stores the map data which is used for displaying map by the controller 5 and for performing a route calculation by the controller 5. The storage medium 13 can keep storage contents even if power supply to the navigation system is cut, and is made up of, for example, an EEPROM, flash ROM, or a hard disk unit.

Figure 2:
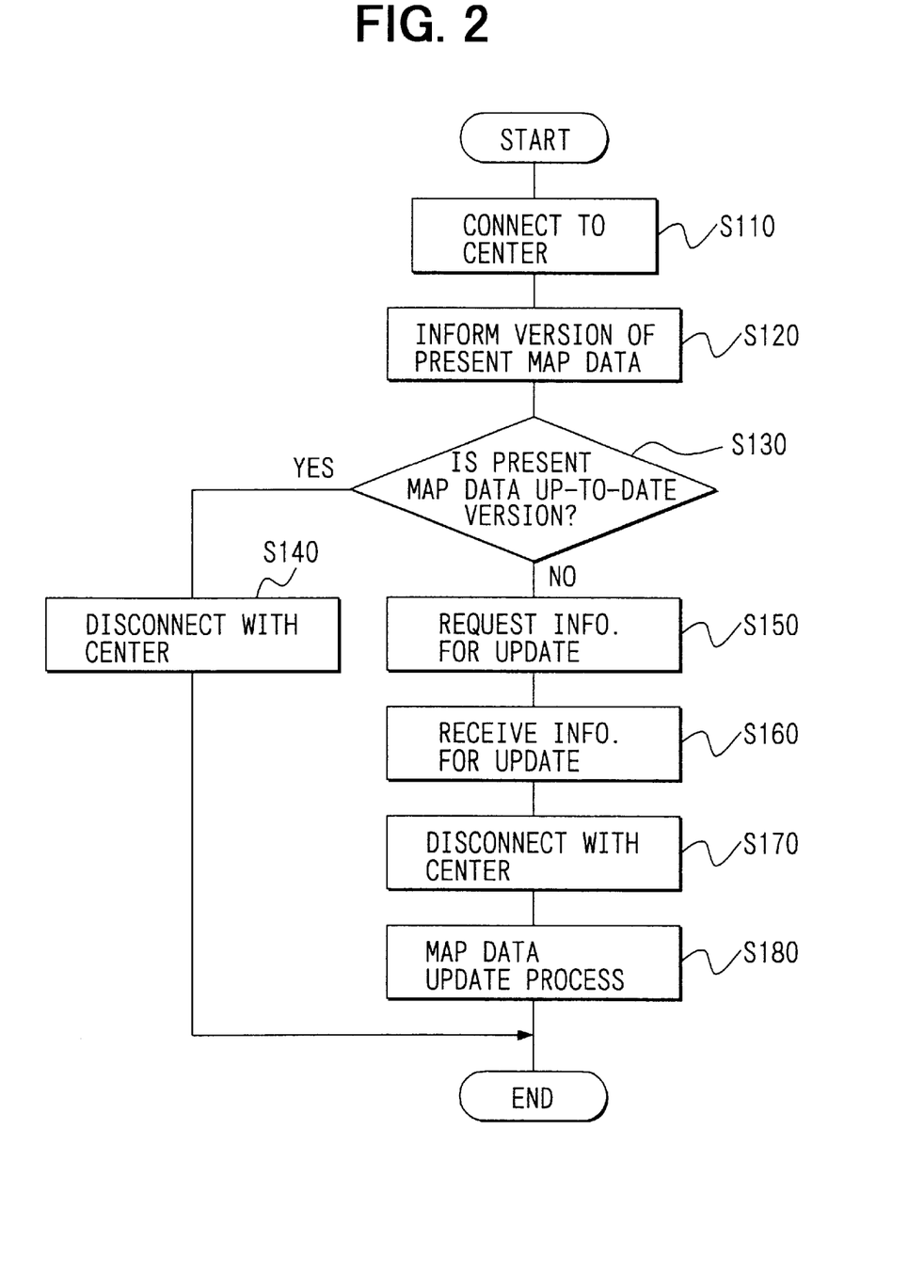
FIG. 2 is a flowchart illustrating a process executed in a controller of a navigation apparatus.

Next, an outline of the differential update system will be explained with reference to FIG. 2. Here, FIG. 2 shows a flowchart illustrating a process to be executed by the controller 5 of the navigation apparatus 3.

In this differential navigation system, when the controller 5 receivers a data update starting request from a user through the input/output unit 7, the controller 5 connects with the center 1 via the communication unit 9 (S110). The controller 5 reads out (fetches) version information of the map data (information regarding when the map data is made) which is presently used in the navigation apparatus from the CD/DVD 11, and informs the read version information to the center 1 via the communication unit 9 (S120).

Then, the center 1 judges whether the map data currently used in the navigation apparatus 3 is the up-to-date version or not based on the version information from the navigation apparatus 3, and transmits a judgment result to the navigation apparatus 3.

In this case, the controller 5 receives the judgment result from the center 1 via the communication unit 9, and decodes the judgment result. When the map data is the up-to-date version (S139: YES), the controller 5 disconnects with the center 1, (S140). This is because there is no need to update the map data.

On the contrary, when the map data is not the up-to-date version (S130: NO), the controller 5 transmits signal for requesting information for update (update information) of the map data (S150).

Next, the center 1 transmits the update information from the map data in the CD/DVD which is presently used in the apparatus 3 to the up-to-date version to the navigation apparatus. The controller 5 in the navigation apparatus 3 receives the update information from the center 1 via the communication unit 5 (S160).

Next, the controller 5 disconnects with the center 1 (S170). The controller 5 performs the update process of the map data based on particular addresses included in the map data in the CD/DVD, by using the update information received from the center 1 (S180).

Here, the update process will be briefly explained. In this embodiment, the update information to be transmitted from the center 1 to the navigation apparatus 3 includes data indicating which graphic data stored in the CD/DVD 11 is to be updated and data indicating how is the graphic data updated, regarding at least the graphic data in the map data in the CD/DVD 11 of the navigation apparatus 3. For example, in the case of graphic data to be deleted, content changing information indicating "delete" is added to storage position information of the map data. In the case of graphic data to be changed, content changing information indicating "change" and content updating information containing new graphic data are added to storage position information of the map data. Furthermore, in the case of graphic data to be simply added, content changing information indicating "add" is added to map data to be added.

Therefore, in the update process of the navigation apparatus 3, the controller 5 analyzes the update information from the center 1. When the update information contains the storage position information to which the content changing information indicating "delete" is added, for example, the controller 5 stores usage information into the storage medium 13 that the controller 5 does not use the map data stored in a particular storage position in the CD/DVD 11 indicated by the storage position information. When the update information contains the storage position information to which the content changing information indicating "change" and the new graphic data after changing are added, for example, the controller 5 stores the new graphic data into the storage medium 13 and stores usage information into the storage medium 13 that the controller 5 uses the new graphic data instead of the map data stored in a particular storage position in the CD/DVD 11 indicated by the storage position information. Moreover, when the update information contains the storage position information to which the content changing information indicating "add" is added, for example, the controller 5 stores the new map data to be added and the usage information into the storage medium 13 that the controller 5 adds the new map data to the map data stored in the CD/DVD 11.

After this process, the controller 5 of the navigation apparatus 3 uses the map data in the CD/DVD 11 and the data in the storage medium 13 to display the map based on the usage information stored in the storage medium at the update process. In this way, the map data to be used for displaying the map and is stored in the CD/DVD 11 of the navigation apparatus is updated to the up-to-date version (content).

On the contrary, in the center 1, the CD/DVD to be provided to the navigation apparatus 3 and the update information are generated based on the following procedure.

Figure 3A:
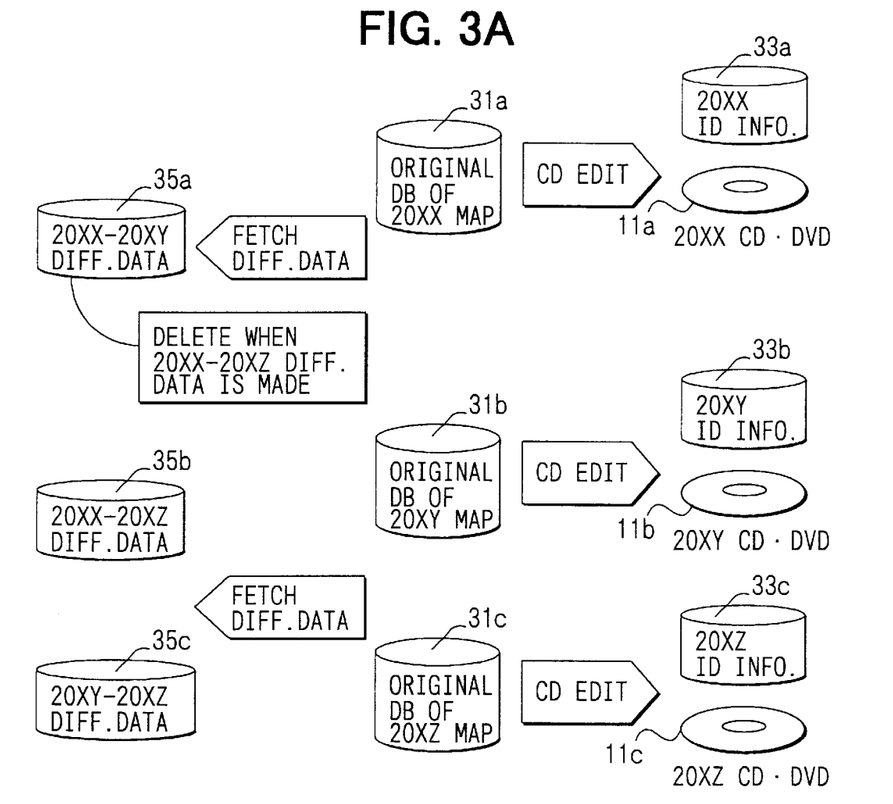
FIGS. 3A and 3B are diagrams illustrating procedures for making a CD or a DVD (storage medium in which the map data is stored) and for making update information.
Figure 3B:
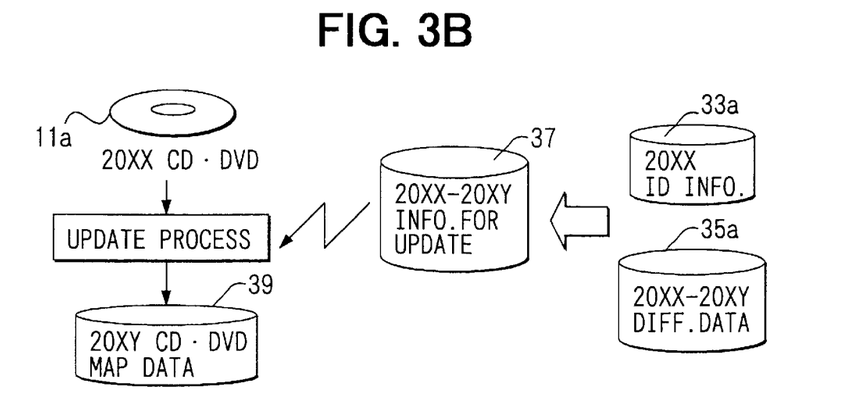

In FIGS. 3A and 3B, it is assumed that data base of the original map data (original map DB) which becomes original data of the map date stored in the CD/DVD is annually updated such that year 20XX, 20XY and 20XZ. In this embodiment, the original map DBs 31a, 31b and 31c are prepared by external software firm and are shipped to the center 1.

(Procedure 1): At first, when the software firm newly generates the original map DBs 31a, 31b and 31c, the software firm adds unchanging identification information (hereinafter, called "permanent ID") to at least each graphic data included in the data of the original map DB (original map data). The permanent ID is unchanged among the old original map DB and the new original map DB.

Figure 4A:
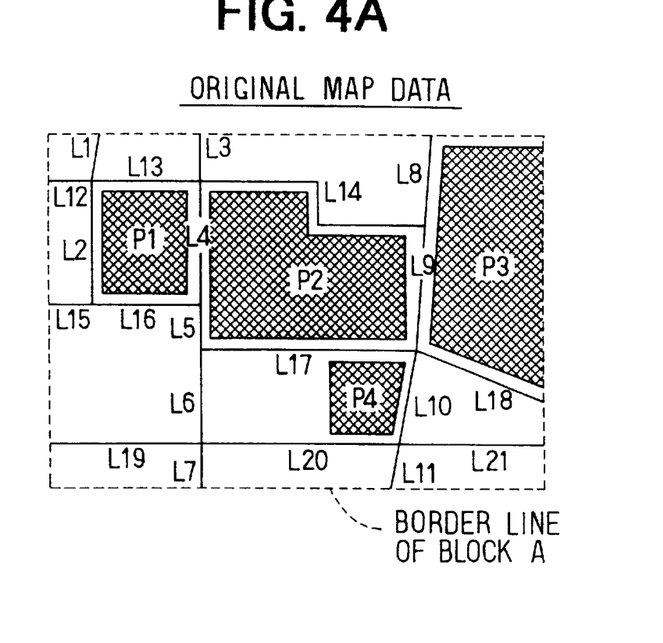
FIGS. 4A and 4B are diagrams illustrating a relationship between original map data and map data to be stored in the CD/DVD.
Figure 4B:
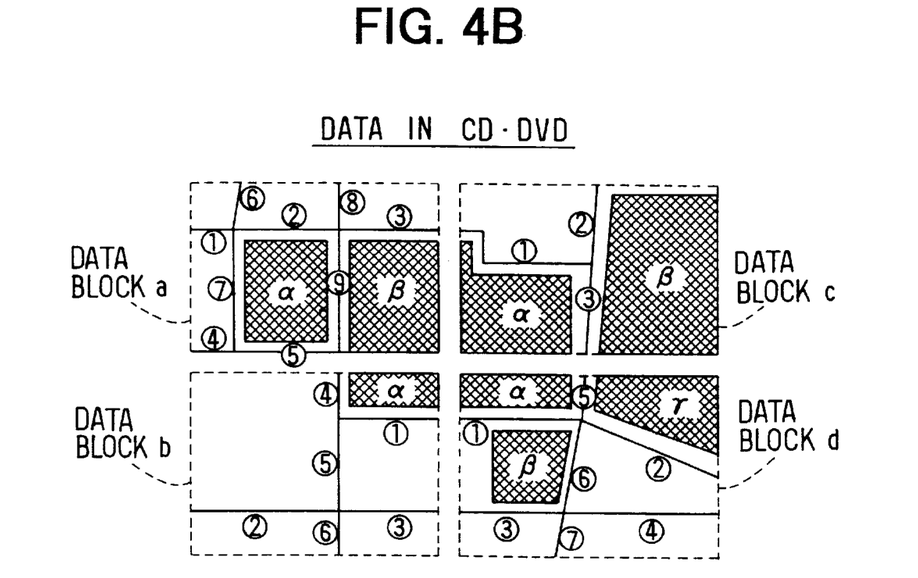

In detail, as shown in FIG. 4A, in this embodiment, the original map data is prepared as a unit of block. Sub-block ID is putted to each graphic data indicating a link (line indicating road) in the block or indicating a polygon (polygon indicating a facility etc). Each sub-block ID is unique in each block. Here, in FIG. 4A, the sub-block ID starting from "L" indicates particular sub-block ID putted to the graphic data of the link; and the sub-block ID starting from "P" indicates particular sub-block ID putted to the graphic data of the polygon. In this embodiment, block identification ID (hereinafter, called "block ID") is putted to each block in the original map data (in FIG. 4A, shown as "A"). The block ID in the original map data and the sub-block ID are defined as the permanent ID of each graphic data (see FIGS. 5A and 5B). The permanent ID is constant between the old and new original map DB as long as the graphic data is identical.

(Procedure 2): Next, as shown in FIG. 3A, in the center 1, newest year version CD/DVD is generated every time the original map DB 31a, 31b or 31c of each year is arrived. In detail, year 20XX version CD/DVD 11a is generated by editing the map data of the year 20XX version original map DB 31a; year 20XY version CD/DVD 11b is generated by editing the map data of the year 20XY version original map DB 31b; and year 20XZ version CD/DVD 11c is generated by editing the map data of the year 20XZ version original map DB 31c.

During the edition of the CD/DVD 11a, 11b or 11c, the shape-deform process or the thin out of the shape point coordinate train data are performed to reduce the amount of data.

Here, the CD/DVD generated in this way will be sold in a predetermined selling route, and is mounted to the navigation apparatus 3.

Figure 5A:
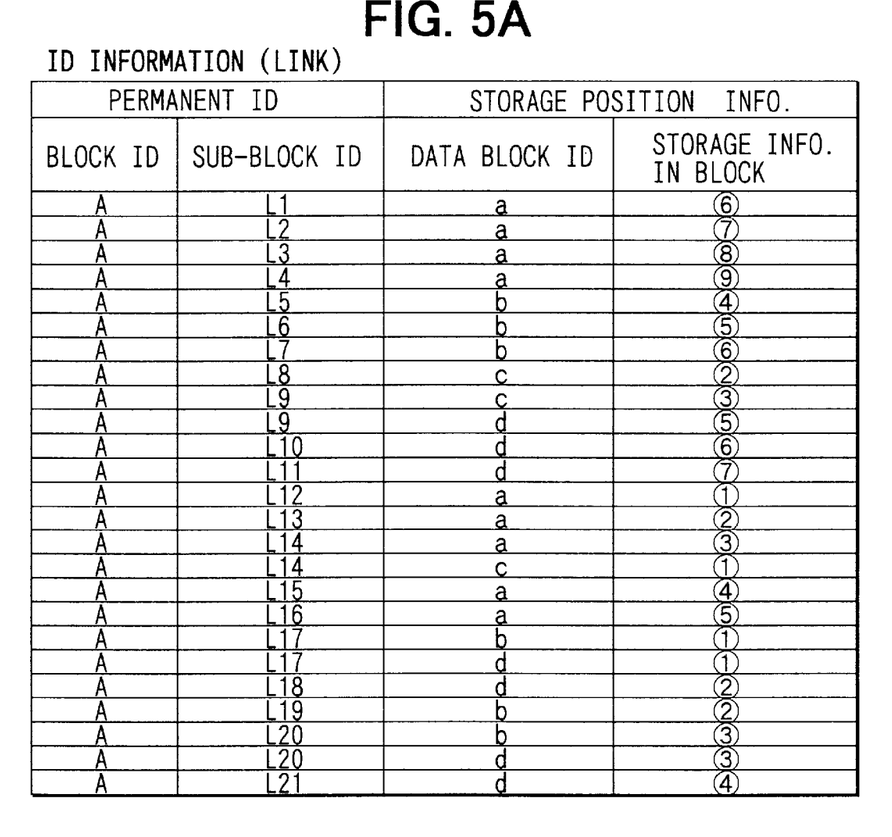
FIGS. 5A and 5B are tables illustrating ID administration information.
Figure 5B:
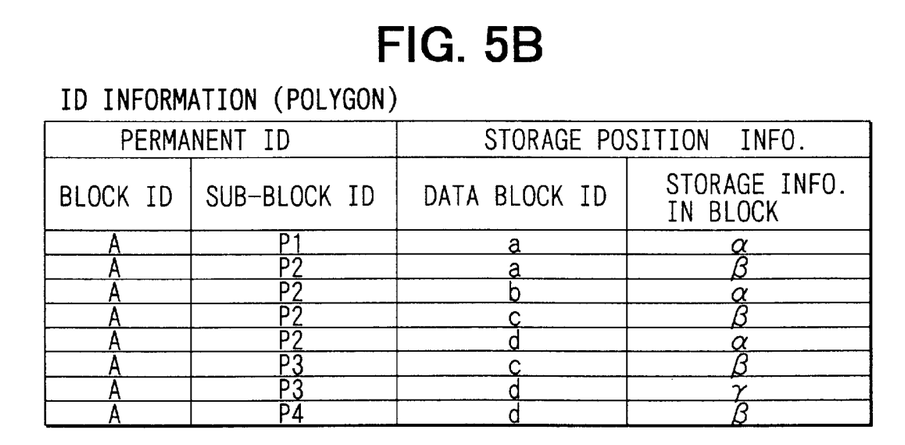

Furthermore, in the center 1, when the CD/DVD 11a, 11b or 11c for each year is generated, data table as shown in FIGS. 5a and 5b are stored in the predetermined storage medium as ID administration information (administration information) 33a, 33b or 33c for each year. In the data table, the permanent ID of the graphic data stored in the CD/DVD and the storage position information of the graphic data indicating the storage position in the CD/DVD are stored therein by being associated with each other.

In more detail, as shown in FIGS. 5A and 5B, in this embodiment, combination of data block identification ID (data block ID) (in FIGS. 5A and 5B, "a"–"d") of each data block in the CD/DVD to be generated and storage information in the block (sub-block storage information) (in FIGS. 5A and 5B, "①"–"⑨" and "α"–"γ") in the data block is used as the storage position information. Here, as the sub-block storage information, address, offset from a header of the data block, or order number of the data counted from the header of the data block can be used instead. Moreover, when the CD/DVD does not have a concept of the data block, the address which can uniquely indicate the storage region in the CD/DVD may be used as the storage position information without using data block ID.

For example, as shown in FIG. 4A, when there are links L1–L21 and the polygons P1–P3 in the block A of the 20XX version original map data. It is assumed that each of the graphic data is edited and is stored in the four data blocks a–d in the CD/DVD 11a of year 20XX version. In this case, as shown in a first line of the data table in FIG. 5A, the 20XX version ID administration information is generated so that the graphic data of the link, in which the block ID is "A" and the sub-block ID is "L1", is stored in a particular position corresponding to the sub-block information ⑥ in the data block a in the 20XX version CD/DVD 11a.

(Procedure 3): In the center 1, as shown in FIG. 3A, when 20XY version original map DB 31b is arrived, differential data (20XX-20XY) 35a between the 20XX version and the 20XY version is manually or automatically stored in the storage medium, after comparing the 20XY version original map DB 31b and the 20XX version original map DB 31a. Here, the differential data 35a shows that which graphic data having the permanent ID is updated and how is the graphic data is updated from the 20XX version original map DB 31a to the 20XY version original map DB 31b. The differential data corresponds to differential information.

Figure 6A:
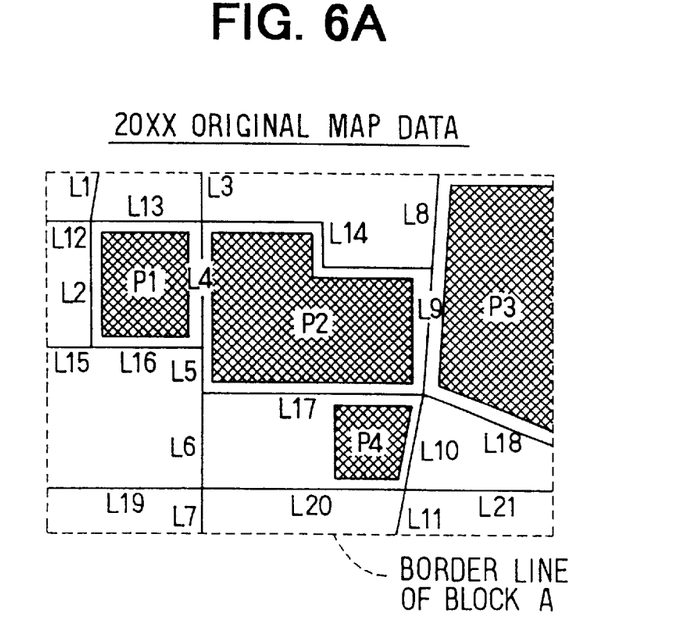
FIGS. 6A and 6B are diagrams illustrating an annual update of the original map data.
Figure 6B:
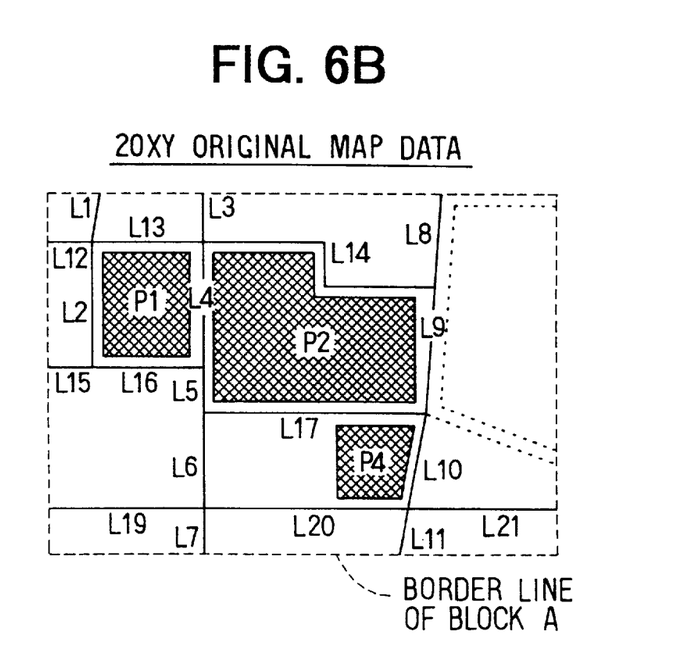
Figure 7A:
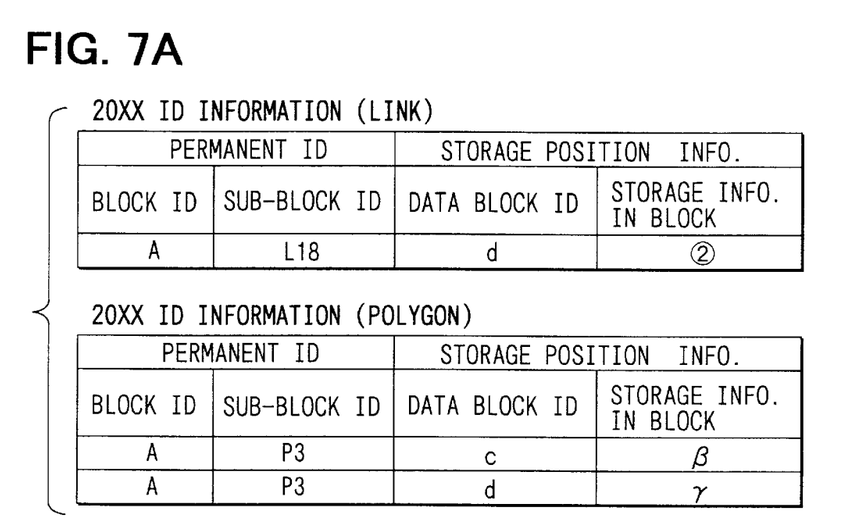
FIGS. 7A, 7B, 7C are diagrams illustrating a generating process of the update information.
Figure 7B:
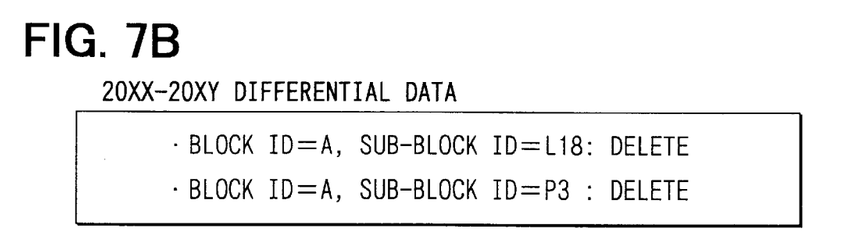

For example, as shown in FIGS. 6A and 6B, when the graphic data of polygon P3 showing a park which existed at the block A and the graphic data of link L18 showing a road in front of the park are deleted as a result of annual updating from the 20XX version original map data to the 20XY version original map data, the differential data 35a between the 20XX version and 20XY version is described as follows.

As shown in FIG. 7B: the graphic data in which the block ID is "A" and the sub-block ID is "L18" (in this case, the graphic data of the link L18) is deleted; and the graphic data in which the block ID is "A" and the sub-block ID is "P3" (in this case, the graphic data of the polygon P3) is deleted.

Moreover, in the center 1, as shown in FIG. 3A, when 20XZ version original map DB 31c is arrived, differential data (20XX-20XZ) 35a between the 20XX version and the 20XZ version is generated, after comparing the 20XZ version original map DB 31c and the 20XX version original map DB 31a. Also, differential data (20XY-20XZ) 35c between the 20XY version and the 20XZ version is generated, after comparing the 20XZ version original map DB 31c and the 20XY version original map DB 31b.

Here, the differential data 35b shows that which graphic data having the permanent ID is updated and how is the graphic data is updated from the 20XX version original map DB 31a to the 20XZ version original map DB 31c. The differential data 35c shows that which graphic data having the permanent ID is updated and how is the graphic data is updated from the 20XY version original map DB 31b to the 20XZ version original map DB 31c. Here, each of the differential data 35b and 35c is also stored in the predetermined storage medium. At this timing, the differential data 35a between the 20XX version and 20XY version is abandoned because the differential data 35a does not contain up-to-date contents.

In detail, in the center 1, every time the up-to-date original map data is arrived to the center 1, the up-to-date version original map data and the old original map data is compared, and a differential data between both original map data is generated. The old differential data is abandoned. Here, there is no problem to keep the old differential data without deleting it.

(Procedure 4): After that, in the center 1, in a case where the update information (20XX-20XY update information) for updating the map data stored in the 20XX version CD/DVD 11a to the map data the same as the map data stored in the 20XY version CD/DVD 11b, in other words, in a case where the update information for updating the map data stored in the 20XX version CD/DVD 11a to the up-to-date version when the 20XZ version original map DB 31a and the CD/DVD 11c do not exist yet, the data indicating which graphic data in the 20XX version CD/DVD 11a is updated and how is the graphic data is updated is generated as a 20XX-20XY update information 37, based on the differential data 35a between the 20XX version and the 20XY version, and based on the ID administration information 33a of year 20XX.

For example, in the case of above embodiment described with reference to FIGS. 4A–7C, the storage position information (data block ID and the sub-block storage information) of the graphic data of the permanent ID which is fetched as the differential data 35a from the 20XX version ID administration information 33a shown in FIGS. 5A and 5B is fetched. After that, as shown in FIG. 7C, the 20XX-20XY update information 37 is generated as follows based on the fetched storage position information and the changed contents indicating by the differential data 35a.

Figure 7C:
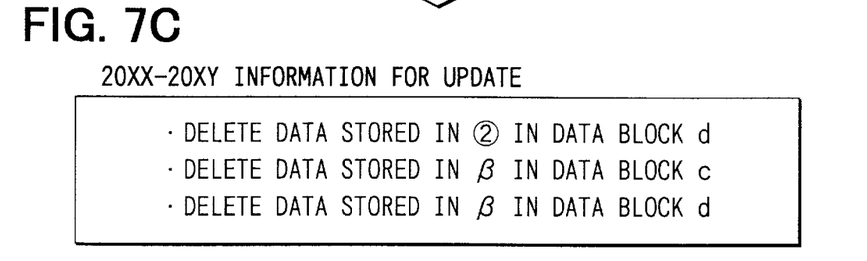

As shown in FIG. 7C: the graphic data stored in ② of the data block d (in this case, the graphic data of the link L18) is deleted; the graphic data stored in β of the data block d (in this case, the graphic data of the polygon P3) is deleted; and the graphic data stored in γ of the data block d (in this case, the graphic data of the polygon P3) is deleted.

In other words, where is the graphic data of a particular permanent ID stored in the 20XX version CD/DVD 11a can be specified by the ID administration information 33a of year 20XX; and how is the graphic data of the particular permanent ID updated can be specified based on the differential data 35a between the 20XX version and 20XY version. Therefore, the 20XX-20XY update information 37, which indicates which graphic data (where is the storage position) in the 20XX version CD/DVD 11a is updated and how is the graphic data is updated, is generated based on two information 33a and 35a.

Furthermore, in the center 1, in a case where the update information (20XX-20XZ update information) for updating the map data stored in the 20XX version CD/DVD 11a to the map data the same as the map data stored in the 20XZ version CD/DVD 11c, similar to the above described procedure, the data indicating which graphic data in the 20XX version CD/DVD 11a is updated and how is the graphic data is updated is generated as a 20XX-20XZ update information, based on the differential data 35b between the 20XX version and the 20XZ version, and based on the ID administration information 33a of year 20XX.

In a case where the update information (20XY-20XZ update information) for updating the map data stored in the 20XY version CD/DVD 11b to the map data the same as the map data stored in the 20XZ version CD/DVD 11c, similar to the above described procedure, the data indicating which graphic data in the 20XY version CD/DVD 11b is updated and how is the graphic data is updated is generated as a 20XY-20XZ update information, based on the differential data 35c between the 20XY version and the 20XZ version, and based on the ID administration information 33b of year 20XY.

The CD/DVD to be provided to the navigation apparatus 3 is generated in the center 1 by the procedures 1–4 described in the above.

The update information generated in this way is stored in the predetermined storage medium. One of the update information corresponding to the version information from the navigation apparatus 3 is transmitted to the navigation apparatus 3 from the center 1.

For example, at the time when the 20XZ version original map DB and the CD/DVD 11c has not developed (does not exist), and when the version information transmitted from the navigation apparatus 3 shows the 20XX version (in other words, the navigation apparatus 3 uses the 20XX version CD/DVD 11a), the 20XX-20XY update information 37 is transmitted from the center 1 to the navigation apparatus 3 as shown by an arrow in FIG. 3A. After that, in the navigation apparatus 3, the map data stored in the 20XX version CD/DVD 11a is updated to the 20XY version map data which is the up-to-date version at this timing, as a result of performing the update process in the navigation apparatus 3.

Here, the 20XX version original map DB 31a corresponds to a first original map data; and the procedure to built up the original map data 31a (procedure 1) corresponds to a first step. The map data stored in the 20XX version CD/DVD 11a corresponds to a first map data; the 20XX version ID administration information 33a corresponds to first administration information; and the procedure to generate the ID administration information 33a and the map data in the CD/DVD 11a (procedure 2) corresponds to a second step.

Here, the 20XY version original map DB 31b corresponds to second original map data; and the procedure to build up the original map data 31b (procedure 1) corresponds to a third step. The map data stored in the 20XY version CD/DVD 11b corresponds to second map data; the 20XY version ID administration 33b corresponds to second administration information; and the procedure to generate the ID administration information 33b and the map data in the CD/DVD 11b (procedure 2) corresponds to a fourth step.

Furthermore, the procedure to generate the 20XX-20XY differential data 35a (procedure 3) corresponds to a fifth step, and the procedure to generate the 20XX-20XY update information 37 (procedure 4) corresponds to a sixth step. The Procedure 1, 2, 3 and 4 respectively corresponds to the first, second, third, fourth procedure.

According to the differential update system of this embodiment, the update information for directly assigning the map data to be updated at the storage position in the CD/DVD, by performing the procedures 1–4 with the software firm and the center 1. Therefore, the navigation apparatus 3 which received the update information can search the map data to be updated precisely and speedily. As a result, the map data can be precisely and speedily updated as a unit of the graphic data.

In other words, according to this differential update system, the update information containing the data indicating which graphic data in the CD/DVD 11 is updated and how is the graphic data updated is provided from the center 1 to the navigation apparatus 3. Therefore, the map data stored in the CD/DVD 11 can be updated to the up-to-date content without fail.

Here, in this embodiment, the information center as the external information center receives the up-to-date original map data from the software firm as the map data provider, and generates the differential information based on the up-to-date original map data. However, the information center itself may generate (build up) the up-to-date original map data and the differential information. In this embodiment, the expression "external information provider," can be read as "a side of external information provider", and "external information center" can be read as "a side of external information center".

Here, if a unique ID is putted to each graphic data id the original map data, the unique ID may be used as the permanent ID. The navigation apparatus 3 may be connected with the center 1 with a cable communication via a special connector or the like.

In this embodiment, the usage information of the graph data to be updated, which is obtained by analyzing the received update information, is stored in the storage medium 13, and the map display is performed by using the stored content. However, the data itself in the map data stored in the CD/DVD 11 may be updated based on the usage information of the graphic data to be updated, which is obtained by analyzing the received update information. In this case, the CD/DVD can be selected from rewritable and storable CD/DVD such as CD-RW or DVD-RW. The CD/DVD 11 (storage medium in which the map data is stored, or storage medium for storing the map data) may be selected from a PC card or an IC card.

The present invention can be applied to a map display apparatus which can communicate and is used in a home or as a portable apparatus, instead of the vehicular navigation apparatus.

What is claimed is:

1. A method of generating update information of old map data to that of new map data, comprising:

generating new original map data including graphic data so that permanent identification information is associated with the graphic data, the permanent identification information being identical between the new original map data and old original map data previously generated;

editing the old original map data to generate map data, and recording the map data into a storage medium, wherein administration information including the identification information of the graphic data in the map data and a storage position of the graphic data in the storage medium is generated, and the identification information and the storage position are associated with each other in the administration information;

comparing the new original map data with the old original map data, and generating differential data indicating which graphic data is being updated and how the graphic data is updated, the graphic data being identified by the identification information; and generating update information for old map data generated by editing the old original map data, the update information being generated based on administration data and the administration information generated when old map data is generated by editing the old original data, the update information indicating which graphic data in the storage medium is updated and how the graphic data is updated, and the graphic data being identified by the storage position in the storage medium.

2. A method of generating update information according to claim 1, wherein the differential data indicating the identification information of the map data to be updated further indicates at least one of the method of updating the map data and update contents of the map data to be updated.

3. A method of generating update information according to claim 1, wherein the update information indicating the storage position of the map data to be updated in the storage medium further indicates at least one of the method of updating the map data and update contents of the map data to be updated.

4. A method of generating update information of map data for a differential update system comprising an electrical device including a storage medium for storing map data containing plural graphic data sets, each of the graphic data sets being generated as a shape point coordinate train graphic data, and the map data being generated from an original map database, the method comprising:

generating a first original map database including graphic data so that permanent identification information is associated with each graphic data set, the identification information being unique to each graphic data set and permanent;

manipulating the first original map database to generate a first map data, and recording the first map data into the storage medium, wherein a first administration information including the identification information being unique to each graphic data set and permanent;

generating second original map database based on the first original map database so that the same permanent identification information are associated with graphic data located at the same position between the first original map database and the second original map database;

manipulating the second original map database to generate a second map data, and recording the second map data into a storage medium, wherein a second administration information including the identification information of the graphic data set in the storage medium is generated, the identification information and the storage position is associated with each other in the second administration information;

comparing the first original map database with the second original map database, and generating differential data indicating which of the graphic data sets are being updated and how the graphic data sets are being updated, the graphic data sets being identified by the identification information; and generating update information for the first map data generated by manipulating the first original map database, the update information being generated based on the administration data and the administration information generated when the first map data is generated by manipulating the first original map database, the update information indicating which graphic data sets in the storage medium arc being updated and how the graphic data sets are updated, and the graphic data sets being identified by the storage position in the storage medium.

5. An electronic system having a storage medium that stores map data generated based on original map data stored in an external information provider center and a display device for displaying a map based on the map data stored in the storage medium, the electronic system comprising:

a communication device for retrieving from the external information provider center transmission information including position information of an update subject in graphic data to be stored in the storage medium and update contents of the update subject, the graphic data being selected based on administration information which correlates an identification number and storage position information of graphic data included in the map data in the storage medium, the identification number being assigned to graphic data included in the original map data and unchanging between new original map data and old original map data; and a control device for updating the graphic data of the update subject stored in the storage medium based on the transmission information retrieved from the communication device, and for driving the display device to display a map based on the map data including the updated graphic data.

6. An electronic system according to claim 5, wherein the control device connects a communication line between the communication device and the external information provider center when a request for an update of the map data is input through an input/output device.

7. An electronic system according to claim 6, wherein the control device transmits at least version information of the map data stored in the storage medium to the external information provider center when the communication line is connected between the communication device and the external information provider center.

8. An electronic system according to claim 7, wherein the update contents included in the transmission information retrieved from the external information provider center through the communication line includes at least one of deletions, alterations and additions to the graphic data in the storage medium.

9. An electronic system according to claim 6, wherein the update contents included in the transmission information retrieved from the external information provider center through the communication line includes at least one of deletions, alterations and additions to the graphic data in the storage medium.

10. An electronic system according to claim 5, wherein the storage medium, the display device, the communication device and the control device form a navigation system.

11. An information provider center having a storage medium that stores map data including graphic data formed from latest available original map data and that is provided to an external side, the information provider center comprising:

a storage device for assigning an identification number unchanging between new original map data and old original map data to data included in at least the original map data, and for generating and storing administration information that correlates storage position information of the graphic data included in the map data and the identification number; and means for generating and transmitting to the external side transmission information including position information of an update subject in the graphic data stored in the storage medium and update contents of the update subject, the position information being selected based on the administration information stored in the storage device.

12. An information provider center according to claim 11, wherein the transmission information is transmitted when a map data update request is received from the external side.

13. An information provider center according to claim 12, wherein:
   the transmission information is formed based on version information of the map data stored in the storage medium, and is transmitted to the external side when the map data update request is received from the external side.

14. An information provider center according to claim 13, wherein the update contents included in the transmission information includes at least one of deletions, alterations and additions to the graphic data in the storage medium.

15. An information provider center according to claim 12, wherein the update contents included in the transmission information includes at least one of deletions, alterations and additions to the graphic data in the storage medium.

16. An information provider center according to claim 11, wherein the original map data is map manufacturer provided information.

17. A method of generating graphic data update information included in map data stored in a map storage medium, comprising steps of:
   assigning an identification number unchanging between new original map data and old original map data to graphic data included in original map data that is used as a basis of the map data stored in the map storage medium;
   generating administration information that correlates storage position information of the graphic data in the map storage medium and the unchanging identification number, when generating the map data from the original map data; and
   generating the update information for the graphic data included in the map data stored in the map data storage medium by using the administration information and differential information between the new original map data and the old original map data.

18. The method according to claim 17, wherein the map storage medium is used for a navigation system and the update information is transmitted to the navigation system through a communication device.

19. The method according to claim 17, wherein the update information is transmitted to the navigation system when a map data update request is made from the navigation system.

* * * * *